US010750598B2

(12) United States Patent
Gopal Samy et al.

(10) Patent No.: US 10,750,598 B2
(45) Date of Patent: Aug. 18, 2020

(54) SYSTEMS AND METHODS FOR LIGHTING FIXTURE LOCATION MAPPING

(71) Applicant: PHILIPS LIGHTING HOLDING B.V., Eindhoven (NL)

(72) Inventors: Mathan Kumar Gopal Samy, Medford, MA (US); Jia Hu, Brookline, MA (US); Maulin Dahyabhai Patel, Tuckahoe, NY (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/753,833

(22) PCT Filed: Aug. 9, 2016

(86) PCT No.: PCT/EP2016/068946
§ 371 (c)(1),
(2) Date: Feb. 20, 2018

(87) PCT Pub. No.: WO2017/032589
PCT Pub. Date: Mar. 2, 2017

(65) Prior Publication Data
US 2018/0242430 A1  Aug. 23, 2018

Related U.S. Application Data

(60) Provisional application No. 62/210,755, filed on Aug. 27, 2015.

(51) Int. Cl.
*H05B 47/175* (2020.01)
*H05B 47/105* (2020.01)

(52) U.S. Cl.
CPC ......... *H05B 47/175* (2020.01); *H05B 47/105* (2020.01)

(58) Field of Classification Search
CPC ...... G01J 1/0219; G01J 1/0266; G01J 1/0403; G01J 1/4228; G01S 11/12; G01S 17/026;
(Continued)

(56) References Cited

U.S. PATENT DOCUMENTS 8,159,156 B2    4/2012  Henig et al.
2012/0306377 A1* 12/2012  Igaki ................... F21V 23/0464
                                           315/151
(Continued)

FOREIGN PATENT DOCUMENTS

CN     102007733 A    4/2011
WO     2008029326 A2  3/2008

*Primary Examiner* — Renan Luque
(74) *Attorney, Agent, or Firm* — Daniel J. Piotrowski

(57) ABSTRACT

Lighting systems and methods for lighting fixture location mapping, for example, using a combination of photosensing readings and/or other sensors to identify a correct mapping. These systems and methods may be used to resolve ambiguities that could not be resolved using other processes, such an auto-commissioning method that identifies more than one possible mapping of the lighting fixtures to spatial locations. Such ambiguities are typically found in floor plans that are symmetrical. The systems and methods of the present invention record and utilize environmental profiles, such as ambient lighting levels and occupancy patterns, to match lighting fixtures to their respective spatial locations and provide resolution to ambiguities in an auto-commissioning method that identifies more than one possible mapping of the lighting fixtures to spatial locations.

8 Claims, 6 Drawing Sheets

(58) Field of Classification Search
CPC ........... G06K 9/00369; G06K 9/00771; G06K 9/2027; G06T 2207/10016; G06T 2207/10152; G06T 7/521; H05B 33/0803; H05B 33/0806; H05B 33/0854; H05B 37/02; H05B 37/0209; H05B 37/0218; H05B 37/0227; H05B 37/0245; H05B 37/0254; H05B 37/0272; H05B 37/029; H05B 39/00; Y02B 20/46; Y02B 20/48
See application file for complete search history.

(56) References Cited

U.S. PATENT DOCUMENTS

| | | | |
|---|---|---|---|
| 2013/0221203 A1* | 8/2013 | Barrilleaux | G01J 1/0403 250/208.2 |
| 2014/0167620 A1 | 6/2014 | Chobot | |
| 2014/0175990 A1* | 6/2014 | Bhatkar | H05B 37/0245 315/154 |
| 2014/0328211 A1* | 11/2014 | Holleis | H04L 41/145 370/254 |
| 2014/0354161 A1* | 12/2014 | Aggarwal | H05B 37/0245 315/153 |
| 2015/0061509 A1* | 3/2015 | Karlicek | G06K 9/00369 315/153 |
| 2015/0102734 A1* | 4/2015 | Asami | H05B 37/0272 315/154 |
| 2015/0234366 A1* | 8/2015 | Hyman | G01V 9/00 700/19 |
| 2016/0381439 A1* | 12/2016 | Satoh | G05B 15/02 340/870.07 |
| 2017/0167864 A1* | 6/2017 | Maros | H05B 37/0227 |

* cited by examiner

SYSTEMS AND METHODS FOR LIGHTING FIXTURE LOCATION MAPPING

CROSS-REFERENCE TO PRIOR APPLICATIONS

This application is the U.S. National Phase application under 35 U.S.C. § 371 of International Application No. PCT/EP2016/068946, filed on Aug. 9, 2016 which claims the benefit of U.S. Provisional Patent Application No. 62/210,755, filed on Aug. 27, 2015. These applications are hereby incorporated by reference herein.

FIELD OF INVENTION

The present invention relates generally to lighting systems. More specifically, systems and methods for automatic lighting fixture location mapping, for example, using a combination of photosensor readings and/or other sensors to identify a correct mapping in a symmetrical layout.

BACKGROUND

A lighting system may include multiple devices such as lamps, sensors and switches. Each of these devices may be independently obtained and connected to a control system via wired or wireless connections. The control system can provide preprogrammed timers, sensors, and/or control that can help reduce operational costs by ensuring that the correct level of lighting is provided at the appropriate times. Each of the individual and discrete components of a lighting system are typically installed in accordance with a detailed floor plan, which may be provided in the form of construction drawings, e.g., AutoCAD drawings. The lighting systems may be used in both commercial and domestic settings, but are typically installed in large commercial buildings. The floor plans typically specify each device type, its position, and its connection (wired or wireless) to the control system.

In order for the control system to correctly control each of the components of the lighting system, a unique identifier for each lighting fixture (e.g., a bar code, a MAC address, etc.) of the lighting fixture needs to be correlated to the spatial location of the lighting fixture within the floor plan. This process is typically performed after all of the lighting fixtures are installed at their desired locations and performed by a skilled lighting commissioning engineer. The mapping of the each lighting fixture, along with its unique identifier, to the proper spatial location within a floor plan can be performed manually. It typically requires a lighting engineer to manually inspect each individual lighting fixture and manually record data on a printout of a floor plan or input data to an electronic version of the floor plan via a graphical interface. The manually entered data may be inputted or transferred to a fixture database that may associate each recorded identifier with a spatial location shown in the floor plan. Alternatively, a test signal may be used to cycle the power level of each light in turn. An installer or a similar specialist then walks around until the activated light is identified and matched to a spatial location within the floor plan. This process is repeated sequentially for each lighting fixture until all fixtures are correlated to a spatial location within the floor plan. After the lighting fixtures have been commissioned, the control system may provide any number of suitable instructions or configuration parameters to the lighting fixtures to control the operation of the lighting fixtures. For example, the instructions and/or configuration parameters may be provided in the form of a software program that can be uploaded to a memory located within each of the lighting fixtures for further execution.

There are many disadvantages to manually mapping lighting fixtures to spatial locations. For example, the manual commissioning process is time-consuming and can interfere with the ability of other contractors on a building site to proceed with their work. To further complicate the process, building contractors often do not follow the precise lighting layout specified in the floor plan. Therefore, in order to commission the lighting after the lights have been installed, a highly skilled commissioning engineering is needed to conduct manual commissioning, which can be costly. For a large lighting installation, the commission often involves tens or hundreds of lighting fixtures that need to be correlated to their correct spatial locations so that they can be operated appropriately together. This is an arduous and expensive task that can be time consuming and raise the overall installation cost, particularly for large and/or complex lighting installations. Manual commissioning is not only time consuming and costly, but also prone to errors, such as, for example, data input mistakes. Such commissioning errors may lead a control system to send commands to the wrong fixture, or commands that appear to have no effect. During the commissioning of a large installation, the errors may be further amplified.

Computerized methods for commissioning lighting fixtures have been previously describe. For example, U.S. Pat. No. 8,159,156 ("the '156 patent") describes a lighting system for areal illumination having a remote driver and plurality of fixtures including luminaries, control devices, and/or standalone sensors. The '156 patent describes a method of commissioning a lighting system that measures a signal emitted from a signal source to determine relative distance measurements between two fixtures. To identify the spatial location of the fixtures, the '156 patent relies on a triangulation method, which maps each fixture individually and requires at least three references nodes.

As another example, U.S. Patent Application Publication No. 2013/0221203 ("the '203 publication") describes systems and methods for spatial commissioning of a lighting system. The systems may include directional sensors, directional emitter devices and an auto-commissioning module. The auto-commissioning module may receive the direction of the light signal detected by the directional sensors and generate a sensor graph based on the direction of the light signal that is detected by the directional sensors. The auto-commissioning module may map each one of the directional sensors or emitter devices to a corresponding location in a site model based on the sensor graph and on the site model.

Although computerized methods have been used in the commissioning of lighting fixtures, the accuracy of such computerized methods may be subject to lighting topology, layout complexity, signal interference, daylighting and/or other environment parameters. In particular, computerized commissioning methods may not be capable of identifying a single correct mapping of the lighting fixtures, when the lights are arranged in a symmetrical layout. For example, the lights may be arranged in a square layout so that there may be four possible mappings of lighting fixtures to spatial locations, a first arrangement and alternative arrangements that are rotated by 90, 180 or 270 degrees. The computerized methods may not be capable of resolving which one of the four possible mappings for the square layout is the correct match without manual intervention. Such manual intervention requires turning on a lighting fixture and manually entering its spatial location and/or manually assessing if the activated lighting fixture is mapped to the correct location.

These types of manual intervention require repeat trial-and-error tests, which is a labor-intensive process, and becomes increasingly difficult for larger lighting system layouts.

Therefore, there is a continuing need in the art for an improved lighting system and method for commissioning lighting. It is an object of the present invention to provide an improved system and method for mapping a plurality of lighting fixtures to a plurality of spatial locations that can identify a correct mapping in all types of layouts, including a symmetrical and/or complex layout.

SUMMARY OF THE INVENTION

In accordance with the foregoing objectives and others, one embodiment of the present invention provides a method for mapping a plurality of lighting fixtures to a plurality of spatial locations. Each lighting fixture may include one or more sensors. The method comprises generating a first dataset corresponding to a first environmental profile for the plurality of lighting fixtures based on measurements by the sensor of each of the plurality of lighting fixtures, and a second dataset corresponding to a second environmental profile for the plurality of spatial locations based on a floor plan including the plurality of spatial locations. In some embodiments, the first and second environmental profiles are ambient light profiles. In other embodiments, the first and second environmental profiles are occupancy profiles. The method also comprises identifying one or more possible mappings of the plurality of lighting fixtures to the plurality of spatial locations. The method further comprises when more than one possible mapping is identified, identifying a single mapping from the possible mappings based on matching the first dataset to the second dataset. In some embodiments, the one or more possible mappings are identified using a heuristic method.

In one aspect, a lighting system is provided. The lighting system comprises a plurality of lighting fixtures. Each lighting fixture comprising a luminaire and a sensor. The lighting system further comprises a control system configured to independently activate and deactivate each luminaire and to receive data corresponding to a first environmental profile for the plurality of lighting fixtures based on measurements by the sensor of each of the plurality of lighting fixtures. The control system is further configured to generate a second dataset corresponding to a second environmental profile for the plurality of spatial locations based on a floor plan including the plurality of spatial locations, identify one or more possible mappings of the plurality of lighting fixtures to the plurality of spatial locations, and when more than one possible mapping is identified, identify a single mapping from the possible mappings based on matching the first dataset to the second dataset.

In another aspect, a method for identifying orientations of a plurality of lighting fixtures is provided. Each lighting fixture includes a luminaire and a sensor. The method comprises identifying one or more possible mappings of the plurality of lighting fixtures to the plurality of spatial locations. The method also comprises directing the luminaire of each of the plurality of lighting fixtures to emit a visible light. The method further comprises receiving, from a set of adjacent lighting fixtures for each of the plurality of lighting fixtures, a data set corresponding to an intensity of light received by the sensor of each of the adjacent lighting fixtures, wherein the set of adjacent lighting fixtures is determined based on the one or more possible mappings.

The method further includes a step for analyzing each dataset to identify the orientation of each of the plurality of lighting fixtures.

These and other aspects of the invention will become apparent to those skilled in the art after a reading of the following detailed description of the invention, including the figures and appended claims.

DETAILED DESCRIPTION

The exemplary embodiments provide lighting systems and methods for mapping a plurality of lighting fixtures to a plurality of spatial locations in a floor plan by providing an auto-commissioning method that requires little or no manual intervention. Typical methods for mapping a plurality of lighting fixtures to a plurality of spatial locations in a floor plan have often required manual intervention to either initiate the mapping process or to resolve ambiguities between multiple possible permutations for mapping the lighting fixtures to their spatial locations. The systems and methods of the present invention provide for auto-commissioning of a plurality of lighting fixtures with little to no manual input. Specifically, manual intervention may not be needed to identify a correct mapping from more than one possible mappings generated from an auto-commissioning method, particularly, a heuristic auto-commissioning method. Preferably, the systems and methods map the lighting fixtures to their respective spatial locations without any manual intervention during the auto-commissioning process. These systems and methods may be used to resolve ambiguities that could not be resolved using other processes, such an auto-commissioning method that identifies more than one possible mapping of the lighting fixtures to spatial locations. Such ambiguities are typically found in floor plans that are symmetrical. The systems and methods of the present invention may also be used for auto-commissioning without any manual intervention. In certain embodiments, the systems and methods of the present invention do not include directional sensors. In other embodiments, the systems and methods may map the lighting fixtures to their respective spatial locations, without use of any data relating to direction of light received by the sensors. The systems and methods of the present invention may provide auto-commissioning systems and methods having reduced complexity, reduced computational time and/or improved accuracy. Therefore, the process is largely automated and less time and/or resources are needed to commission a lighting system having a plurality of lighting fixture.

Any number of computerized methods may be used for the commissioning of lighting fixtures 102. These methods typically utilize a dense network of radio frequency (RF) sensors or photosensors in the commissioning of lighting fixtures, i.e., mapping a plurality of lighting fixtures 102 to their respective spatial locations within a lighting system 100 after installation. However, the commissioning of lighting fixtures, the accuracy of such computerized methods may be subject to lighting topology, layout complexity, signal interference, daylighting and/or other environment parameters.

Figure 1:
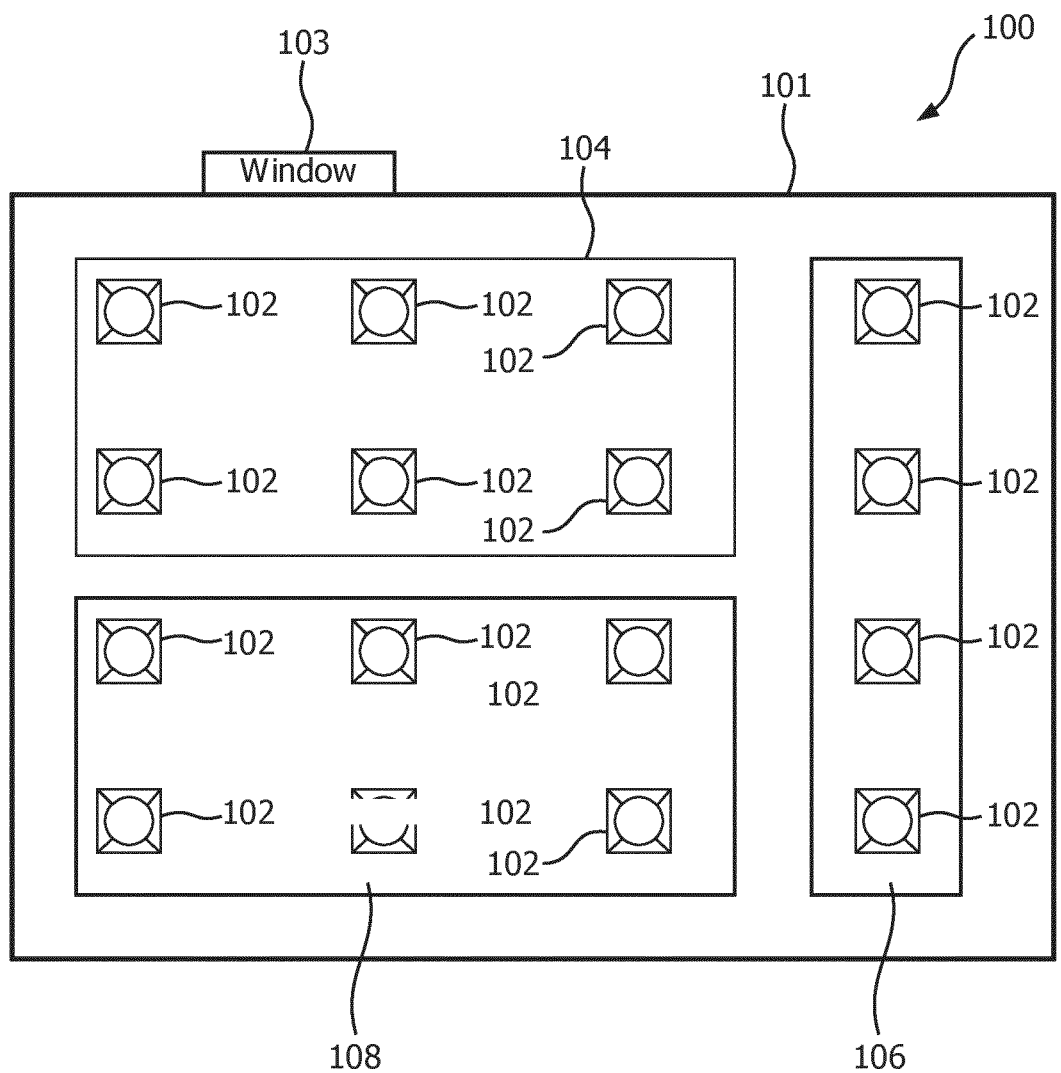
FIG. 1 shows an exemplary embodiment of a lighting system having a plurality of lighting fixtures installed within a floor plan according to the present invention.

For example, computerized commissioning methods typically may not be capable of identifying a single correct mapping of the lighting fixtures and may merely provide an ambiguous identification of more than one possible mapping of the plurality of lighting fixtures to the spatial locations. Such ambiguities are typically found in floor plans that are symmetrical, but may be applicable to any type of floor plan where computerized commissioning methods do not provide sufficient confidence in mapping a plurality of lighting fixtures to spatial locations. For example, office buildings often have a rectangular shape and may include rooms having a rectangular shape. Therefore, these spaces may include lighting systems 100 having lighting fixtures 102 arranged in a symmetrical shape, such as a rectangular layout as shown in FIG. 1. In a symmetrical layout, lighting fixtures 102 on one side of the symmetry may receive indistinguishable lighting signals such that a typical computerized commissioning method based on an intensity of light emitted and received between two lighting fixtures 102 cannot definitively provide a single mapping of the plurality of lighting fixtures 102 to their spatial locations. Instead, the computerized commissioning method may only be capable of identifying more than one possible permutation for the plurality of lighting fixtures 102 to be mapped to spatial locations. For example, in a rectangular layout, lighting fixtures 102 located at all four corners of the rectangle may be indistinguishable from each other to a typical commissioning method. Therefore, the computer commissioning method may be able to identify four possible arrangements of lighting fixtures 102 within the rectangular layout, but cannot resolve which one of the four would be a correct mapping of the lighting fixtures 102 to their spatial locations. As another example, a group of 16 lighting fixtures 102 may be installed in a ceiling in a square (4×4) arrangement. Typical computerized commissioning methods based on photosensing may only be capable of identifying four possible permutations for the plurality of lighting fixtures 102 to be mapped to spatial locations. However, photosensing does not provide any distinguishable patterns that differentiate between each of the four corners within the square. Additional steps are needed to identify the correct mapping of the lighting fixtures 102 to their spatial locations. For example, further resolution of the different permutations for the lighting fixtures 102 to be mapped to spatial locations may require identifying the correct position of one or two corner lighting fixtures 102.

In a large complex floor plan 101, the layout of the lighting fixtures 102 may include several areas within the floor plan 101 that may receive similar and/or indistinguishable lighting signals such that a typical computerized commissioning method based on an intensity of light emitted and received between two lighting fixtures 102. Therefore, these additional areas that cannot be readily distinguished further add to the number of possible permutations for a plurality of lighting fixtures 102 to be mapped to spatial locations. In this scenario, more than two lighting fixtures 102 may need to be mapped to their correct spatial locations in order to resolve which one of the possible mappings would be a correct match.

Computerized commissioning methods may also not be capable of identifying a single correct mapping of the lighting fixtures when the intensity of light detected by the photosensors have reduced accuracy based on various characteristics of the room. For example, when the ceiling of a room or layout is not flat, photosensing may be less accurate. In particular, the irregularities of a non-flat ceiling may cause internal reflection between the ceiling and other surfaces within the floor plan 101. Alternatively, the room may be arranged in an irregular layout such that light may be blocked from some sensors. These irregularities may contribute to the inaccuracy of photosensing, e.g., unexpected reading from photosensor, and may result in a lighting fixture 102 being mapped to an incorrect spatial location.

One approach to identifying the correcting mapping out of more than one possible permutations is to obtain manual input, such as turning on a lighting fixture and manually entering its spatial location and/or manually assessing if the activated lighting fixture is mapped to the correct location. These types of manual intervention require repeat trial-and-error tests, which is a labor intensive process and becomes increasingly difficult for larger lighting system layouts. The systems and methods of the present invention are directed to reduce and/or eliminate such manual intervention. The systems and methods of the present invention provide an efficient process for auto-commissioning the lighting system 100 and may also be used to improve the accuracy and/or validate a mapping of the lighting fixtures 102 to their respective spatial locations. It is noted that the systems and methods of the present invention may be used to augment any type of auto-commissioning methods to identify a single mapping out of possible permutations of mappings of lighting fixtures 102 to their respective spatial locations. The systems and methods of the present invention may also be used to generate a mapping of lighting fixtures 102 to their respective spatial locations directly, without use of another type of auto-commissioning process.

FIG. 1 shows an exemplary lighting system 100 having a plurality of lighting fixtures 102 installed within a floor plan 101 having a window 103. The lighting fixtures 102 may be connected to a control system (not shown) via a logical network, having wired or wireless connections to a control system. Such logical networks may include, for example, a local area network (LAN), a wide area network (WAN), an internal office-wide or building-wide compute network, a corporate intranet, or the Internet. For example, wires to the control system may physically connect the lighting fixtures 102 during installation. The lighting fixtures 102 may communicate with the control system via any suitable wired communication link, e.g., Ethernet, serial port, Universal Serial Bus, etc. Alternatively, the lighting fixtures 102 may communicate with the control system using any suitable wireless communications means, such as, for example, e.g., Bluetooth, IEEE 802.1x, radio frequency, etc. The control system may be configured to provide any number of suitable instructions or configuration parameters to the lighting fixtures to control the operation of the lighting fixtures. For example, the control system may include a processor and a memory. The memory may include a set of instructions for execution by the processor. For example, the set of instructions may include methods for controlling the lighting fixtures 102, including whether it is on or off, and/or the intensity of light emitted from the lighting fixtures 102. The set of instructions may also include methods for commissioning lighting, such as mapping a plurality of lighting fixtures to a plurality of spatial locations in a floor plan.

Figure 2:
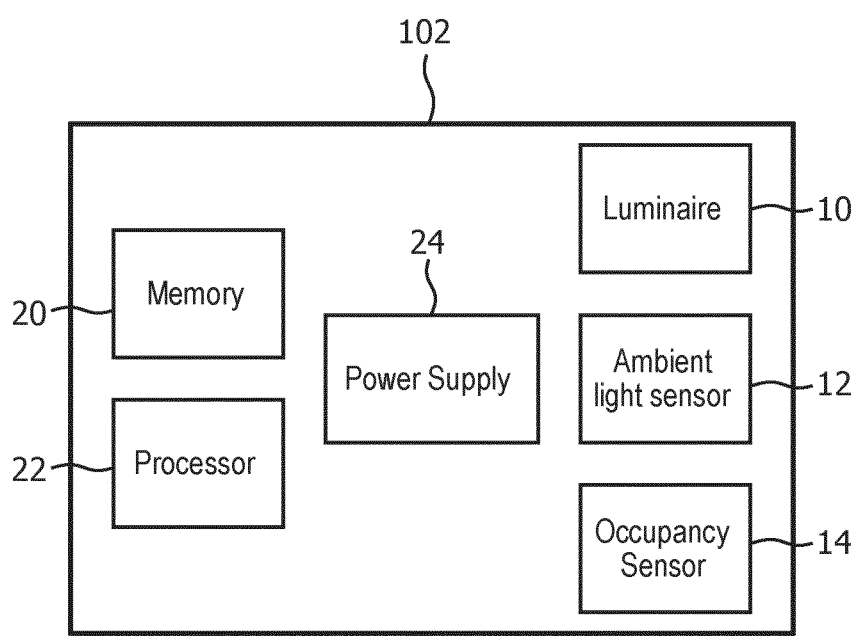
FIG. 2 shows an exemplary embodiment of a lighting fixture according to the present invention.

It is noted that the lighting fixtures 102 need not be identical to each other within a lighting system 100. Rather, the lighting fixtures 102 may each be independently selected from any number of suitable lighting devices, such as a light emitting device, a sensor, or a controller. In a typical lighting system 100, the majority of lighting fixtures 102 within the lighting system 100 may be light emitting devices. As shown in the exemplary embodiment of FIG. 2, the lighting fixture 102 may include a luminaire 10. The luminaire 10 emits a light within the visible spectrum. The lighting fixtures 102 may also be a device that does not emit any light, for example, a sensor device or a controller. The lighting fixture 102 may further include a sensor, such as, for example, an ambient light sensor 12 and/or an occupancy sensor 14. The ambient light sensor 12 may be any suitable sensor for directly or indirectly detecting data correlated to the intensity of ambient light, including but not limited to a photosensor, a thermopile, and/or a pyranometer. Preferably, the ambient light sensor is a photosensor. Specifically, the photosensor may be capable of detecting an intensity of light received therein. Alternatively, a thermopile may be used to indirectly measure the intensity of ambient light near each lighting fixture by measuring the temperature at the lighting fixture. The temperatures measured by the thermopiles are believed to be correlated to the intensity of light that is radiated towards each of the lighting fixtures. In another exemplary embodiment, the ambient light sensor may be a pyranometer, which measures solar radiation in a wide spectrum and is correlated to the intensity of light that is radiated towards each of the lighting fixtures. The occupancy sensor 14 may be any suitable sensor for detecting motion or occupancy information within the floor plan 101. Suitable occupancy sensors 14 may include, for example, a camera, a thermopile, an infrared sensor, a passive infrared (PIR) sensor, an ultrasonic sensor, a photosynthetically active radiation (PAR) sensor, or combinations thereof.

The lighting fixtures 102 may further comprise a memory 20, a processor 22, and/or a power source 24. The memory 20 may include information relating to the identity of the lighting fixtures 102, an electronic unique identifier for the lighting fixture 102 and/or a set of instructions for execution by the processor 22. The set of instructions may include steps for operating the lighting fixture 102. In some embodiments, the set of instructions may be received from the control system, stored in the memory 20 of the lighting fixture 102 for execution by the processor 22. Alternatively, the control system may provide configuration parameters to be used in conjunction with the set of instructions from memory 20 for execution by the processor 22. For example, the instructions and/or configuration parameters may be uploaded by the control system to memory 20 in the form of a software program within each of the lighting fixtures 102 for execution by processor 22.

Those skilled in the art will understand that the exemplary embodiments described herein may be implemented in any number of manners, including as a separate software module, as a combination of hardware and software, etc. For example, the exemplary analysis methods may be embodiment in one or more programs stored in a non-transitory storage medium and containing lines of code that, when compiled, may be executed by at least one of the plurality of processor cores or a separate processor. In some embodiments, a system comprising a plurality of processor cores and a set of instructions executing on the plurality of processor cores may be provided. The set of instructions may be operable to perform the exemplary methods discussed below.

Figure 3:
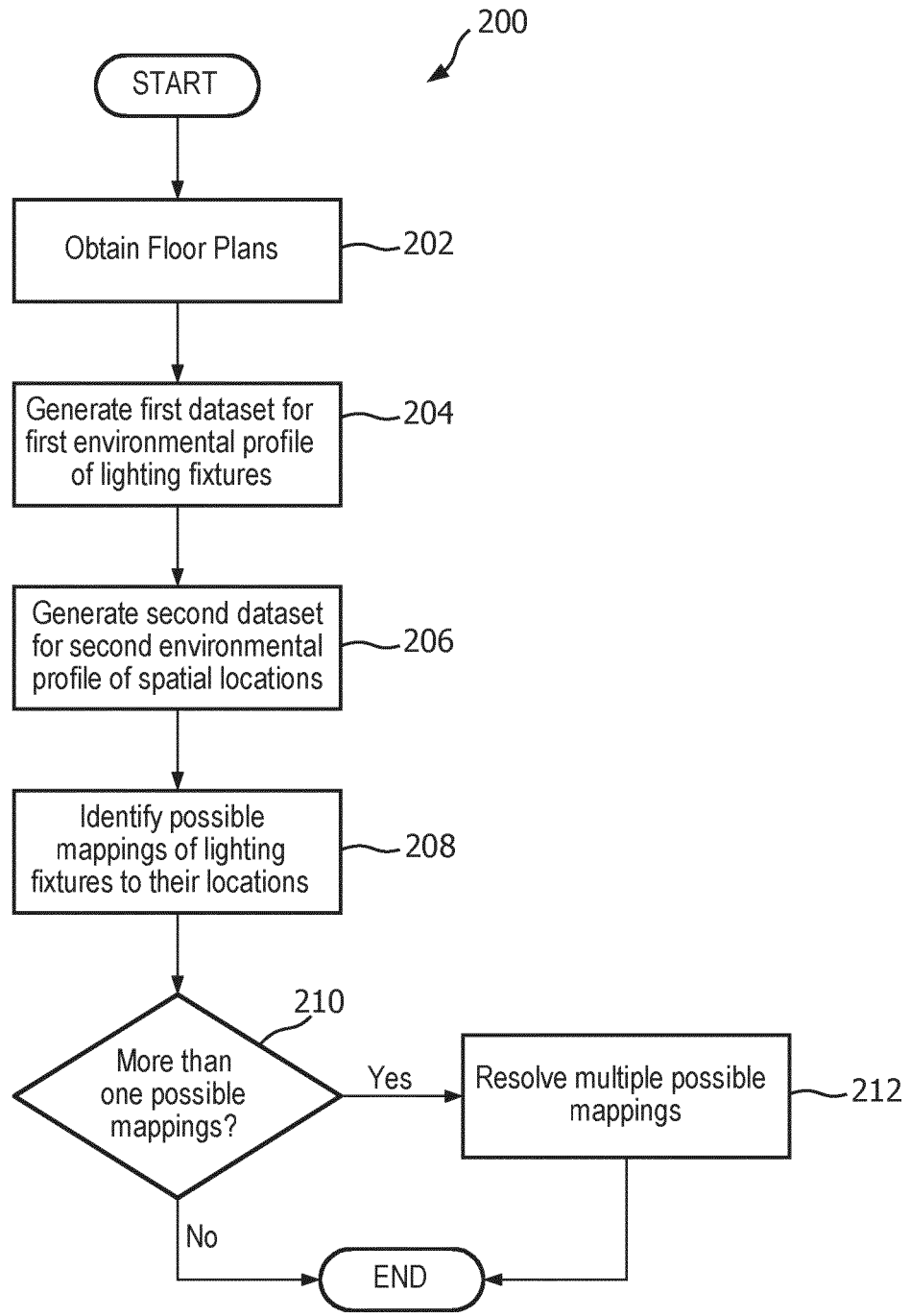
FIG. 3 shows an exemplary embodiment of a method for mapping lighting fixture to their respective spatial locations according to the present invention.

FIG. 3 shows an exemplary method 200 for mapping lighting fixture 102 locations according to the present invention. The method 200 may be executed by a control system for commissioning a set of lighting fixtures 102 within a floor plan 101. In step 202, a building floor plan 101 is received as an input. The building floor plan 101 may be any suitable drawing of the layout of a plurality of lighting fixtures 102 for commissioning. The floor plan 101, which may also be referred to as a reflected ceiling plan, provides the spatial locations for all of the lighting fixtures 102 within a lighting system 100. However, the floor plan 101 does not provide information as to which lighting fixture 102 is located within each spatial location. Therefore, a commissioning process is necessary to map each of the lighting fixtures 102 to their respective spatial locations. The floor plan 101 may be provided in any suitable form. Typically, the floor plan 101 is an architectural drawing providing a graphical demonstration of the spatial locations within the lighting system 100. For example, the floor plan 101 may be provided as a computer-aided design (CAD) drawing or a building information modeling (BIM) drawing. The CAD or BIM drawings may be generated in a computer drawing software and subsequently exported as a floor plan 101 in any suitable machine readable format. In one embodiment, the control system 104 is configured to read the floor plan 101 from the machine readable format. Alternatively, a floor plan 101 may be manually inputted by a user, such as a lighting engineer, based on observing the physical attributes of the building layout and manually inputting the floor plan 101 into the control system 104. The user may manually input the floor plan 101 into the control system 104 via a graphical user interface.

Next, step 204 generates a first data set corresponding to a first environmental profile for the lighting fixtures 102 of the lighting system 100. The first environmental profile may be any suitable measurement of an environmental property or pattern adjacent to the lighting fixtures 102. In some embodiments, the first data set may be obtained while the lighting system 100 is in operation. The first data set may be obtained after the lighting system 100 has been at least partially commissioned. In certain embodiments, the first data set may be continuously collected over a period of time, for example, a day, two days, three days, a week, etc. In step 206, a second dataset corresponding to a second environmental profile for the spatial locations shown in the floor plan 101. The second environmental profile may be generated based on an estimated use or environmental pattern of each of the spatial locations based on the floor plan 101. In some embodiments, the second data set may be obtained immediately after the lighting fixtures 102 are installed within a room. In addition, the second data set may preferably be collected when daylight is present. Alternatively, the second data set may be collected when daylight is absent.

Although each of the spatial locations is indicated within floor plan 101, the floor plan 101 does not provide information as to which lighting fixture 102 is located within each spatial location. The first and second environmental profiles may be of the same type. Suitable environmental profiles may include ambient light profiles and/or occupancy profiles for any floor plan. For example, the first environmental profile may be a direct or indirect measurement of an intensity of ambient light detected at each of the lighting fixtures and the second environmental profile may be an estimated amount of ambient light at each of the spatial locations based on the floor plan. The intensity of ambient light may be directly measure. Alternatively, the intensity of ambient light present may be indirectly determined by measuring, for example, a temperature of the ambient light or an amount of solar radiation within a wide spectrum. As another alternative example, the first environmental profile may be a measurement of an occupancy level or pattern detected at each of the lighting fixtures and the second environmental profile may be an estimated occupancy level or pattern at each of the spatial locations based on the floor plan. Furthermore, both ambient light profiles and occupancy profiles may be used in combination to provide a more accurate mapping of lighting fixtures 102 to their respective spatial locations.

In step 208, any suitable auto-commissioning method may be used to identify one or more possible mappings of lighting fixtures 102 to their spatial locations. The auto-commissioning method may include a heuristic analysis. As shown in step 210, if the auto-commissioning method identifies only a single permutation for mapping the lighting fixtures 102 to the spatial locations, then all of the lighting fixtures 102 within the lighting system 100 are properly mapped to their respective spatial locations. In certain situations, the auto-commissioning method may identify more than one possible mapping of the lighting fixtures 102 to the spatial locations. For example, in floor plans 101 having lighting fixtures 102 that are arranged in a symmetrical manner, such as that shown in FIG. 1, the auto-commissioning method may identify multiple possible mappings of the lighting fixtures 102 to the spatial locations. In step 212, the multiple possible mapping of lighting fixtures 102 may be resolved using the first and second datasets corresponding to the first and second environmental profiles. The first and second datasets may be used to determine which one of the possible mappings may be correct. By matching the first and second datasets with each other, a single mapping of the lighting fixtures 102 to their spatial locations may be identified.

In one exemplary embodiment, method 200 may utilize ambient light profiles as the first and second environmental profiles. In step 204, the first ambient light profile may be based on the strengths and/or intensity of light from the environment of the lighting system 100 received by an ambient light sensor 12 of each of the lighting fixtures 102 within the lighting system 100 in ambient conditions, e.g., without any of the luminaries 10 of the lighting fixtures being activated. Alternatively, the first ambient light profile may be based on data corresponding to the strength and/or intensity of light from the environment of the lighting system 100 received by an ambient light sensor 12, for example, the data may correspond to ambient temperature (e.g., as detected by a thermopile) at each lighting fixture, or an amount of solar radiation (e.g., as detected by a pyranometer) within a wide spectrum detected at each lighting fixture. The ambient light may be generated by the presence of sunlight entering from windows, light that is emitted into the room from adjacent sources, e.g., a room next door, and/or use of additional light admitting devices. The ambient light profile may be measured with or without any occupants within the space. In addition, if the ambient light is from an artificial source, e.g., a room next door, and/or use of additional light admitting devices, a baseline level of ambient light or measurements correlated to the baseline level of ambient light may be determined before the ambient light profile is determined. The baseline level of an ambient light, or measurements correlated to the baseline level of ambient light, may be measured at night or may be an average value of the measurements detected at night. The readings detected by the ambient light sensors may be evaluated in comparison to this baseline level. For example, the baseline level may be subtracted from the measurements obtained by the ambient light sensors.

As discussed above, the ambient light sensor 12 may be a photosensor that can directly detect the intensity of ambient light received therein. The ambient light sensor 12 may also be a thermopile that can be used to indirectly measure the intensity of ambient light near each lighting fixture by measuring the temperature at the lighting fixture. In particular, areas receiving direct sunlight may demonstrate higher ambient temperatures as compared to surrounding areas. Therefore, thermopiles may also serve as ambient light sensors 12 to indirectly determine which lighting fixtures 102 within the lighting system 101 receives more ambient light and may therefore, be positioned closer to an ambient light source.

The ambient light levels may be continuously and/or repeatedly measured for any suitable length of time. The ambient light levels may be continuously measured during normal operation hours of the space portrayed by the floor plan 101, such as, for example, during business hours of an office building or a retail store for a single day or for multiple days. In some embodiments, the ambient light levels may be continuously measured for at least 1 hour, 3 hour, 8 hours, 10 hours, 1 day, 2 days, 3 days or a week. In a preferred embodiment, the ambient light levels may be monitored during daylight times. The ambient light sensors 12 of each lighting fixture 102 may be used to measure the daylight distribution to the lighting system 101 throughout the day. The ambient light levels may be continuously monitored over time to determine an ambient light profile. For example, photosensors of each lighting fixture 102 may continuously monitor ambient light levels for a period of one day. As another example, photosensors of each lighting fixtures 102 may monitor ambient light levels during daylight times across two days.

In step 206, a second ambient light profile may be determined based on an estimated level of ambient light for each of the spatial locations based on the floor plan 101. In an exemplary embodiment, the floor plan 101 may include a window 103 allowing sunlight into the layout throughout the day. For example, the window 103 may be east facing and thus, the spatial locations closest to the window 103 should experience a high level of ambient light in the mornings, whereas spatial locations further away from the window 103 should experience a lower and most consistent level of ambient light throughout the day. The estimated ambient light levels for each of the spatial locations may be determined based on the floor plan 101.

In step 212, the first and second ambient light profiles may be used to resolve multiple possible mappings of lighting fixtures 102 to their spatial locations. In some embodiments, the first and second ambient light profiles may be matched to each other to determine which one of the possible mappings would also coincide with the ambient light profiles. The ambient light profiles may also be used to separate a set of lighting fixtures 102 into multiple groups. Each of the groups may be separately commissioned using any suitable method. A lighting engineer may still manually resolve ambiguities within each of the groups. However, separation of the lighting fixtures 102 into multiple groups can reduce the overall workload by the lighting engineers and limit manual intervention only to those limited areas that could not otherwise be resolved by the process described herein. Furthermore, the ambient light profiles may also be used to estimate approximate locations of the lighting fixtures 102. For example, there may be a noticeable delay in daylight peaks measured between a lighting fixture and a last lighting fixture that faces east. When the sun angle during the day from east to west, correlation between the sun motion and peak ambient light measurements obtained from each of the ambient light sensors provide further information to the ambient light profiles that may be useful in matching the lighting fixtures 102 to their respective spatial locations.

In the exemplary floor plan 101 shown in FIG. 1, the window 103 may be east facing and thus, the spatial locations closest to the window 103 should experience a high level of ambient light in the mornings, whereas spatial locations further away from the window 103 should experience a lower and most consistent level of ambient light throughout the day. In this particular example, the lighting fixtures 102 may be separated into three groups: First, group 104 includes spatial locations showing a high level of ambient light being recorded in the morning. Secondly, group 106 includes spatial locations having ambient light levels that are lower than that of group 104 but provides ambient light at a level that is greater in the morning and less in the afternoon, similar to that of group 104. Thirdly, group 108 includes spatial locations having lower and most consistent levels of ambient light. The lighting fixtures 102 may be divided similarly into three groups based on the ambient light profiles detected by the ambient light sensor 12 of each lighting fixture 102. Each of the groups of lighting fixtures 102 may be matched to one of group 104, 106 or 108.

In another exemplary embodiment, method 200 may utilize occupancy profiles as the first and second environmental profiles. The occupancy profiles may include, for example, a distribution of motion over time, a flow of occupancy traffic over a period of time, and/or a pattern of occupancy and motion over a period of time. In step 204, the first occupancy profile may be based on motion and/or direction of motion from the environment of the lighting system 100 detected by the occupancy sensor 14 of each of the lighting fixtures 102 within the lighting system 100 during normal use conditions. In one embodiment, the occupancy profiles of the lighting fixtures 102 may be measured by directing the lighting system 100 to operate in a learning mode. In the learning mode, the control system of the lighting system 100 may continue to provide any number of suitable instructions or configuration parameters to the lighting fixtures to control the operation of the lighting fixtures 102. Alternatively, the control system in the learning mode may only receive data from the occupancy sensors 14 and cease to control the operation of the lighting fixtures 102 for the duration of the learning mode. After data is collected during the learning mode, an occupancy profile of the lighting system 100 over time may be obtained. The occupancy profile may include occupant-tracking analysis that may include data corresponding to motion paths of interest.

The occupancy sensors 14 may detect motion near each of the lighting fixtures 102. For each motion detected, the motion itself, the direction of motion with respect to the occupancy sensor's 14 field of view, the number of occupants detected and/or other occupancy data may be recorded. The occupancy profiles may be continuously and/or repeatedly measured for any suitable length of time. The occupancy profiles may be continuously measured during normal operation hours of the space portrayed by the floor plan 101, such as, for example, during business hours of an office building or a retail store for a single day or for multiple days. In some embodiments, the occupancy profiles may be continuously measured for at least 8 hours, 10 hours, 12 hours, 1 day, 2 days, 3 days, or a week. The motions detected by the occupancy sensors 14 may be continuously monitored over time to determine an occupancy profile. For example, occupancy sensors 14 of each lighting fixture 102 may continuously monitor motion near each lighting fixtures 102 for a period of one day. As another example, occupancy sensors of each lighting fixtures 102 may monitor motion and occupancy levels across multiple days. In step 206, a second occupancy profile may be determined based on an estimated occupancy profile for the lighting system 100 based on the floor plan 101 and anticipated usage of the space. For example, a corridor may experience significantly more motion than a closet or a space that cannot be accessed by all occupants. In step 212, the first and second occupancy profiles may be used to resolve multiple possible mappings of lighting fixtures 102 to their spatial locations. In some embodiments, the first and second occupancy profiles may be matched to each other to determine which one of the possible mappings would also coincide with the occupancy profiles.

Figure 4:
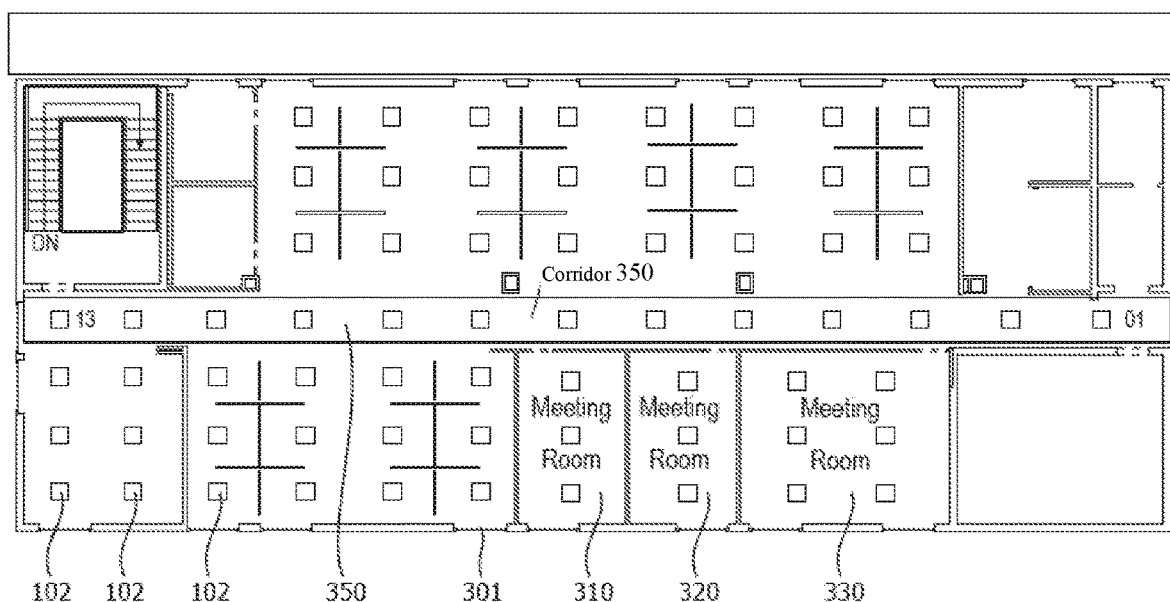
FIG. 4 shows an example of a floor plan having a plurality of light fixtures.

For example, a typical layout of lighting fixtures 102 in a lighting system 100 in an office is shown the floor plan 301 of FIG. 4. The floor plan 301 may include one or more meeting rooms 310, 320, 330, each room being enclosed by walls and separated from the rest of the floor plan 301. In this exemplary floor plan 301, occupants may enter from a door located on a north side of the floor plan 301, next to the lighting fixture 102 labeled with the identifier "01". When a first occupant occupies the space, the longest path the first occupant can possibly travel without triggering the same occupancy sensor 14 twice is within the corridor 350. Upon identifying such a motion path in the first occupancy profile of the lighting fixtures 102, these lighting fixtures 102 may be grouped together as a corridor group. A scheduling program, such as Microsoft Outlook may also be used to determine the occupancy pattern for each of the meetings rooms 310, 320, 330. For example, a meeting may be reserved within a predetermined period of time for room 310. Therefore, lighting fixtures 102 that detect motion activity within that period may also be grouped together as a group corresponding to meeting room 310. The scheduling program may be similarly used to group lighting fixtures 102 correspond to the other meeting rooms 320, 330.

The sequence of motion sensors that are triggered while the first occupant takes a path within floor plan 301 may be related to the spatial location of the lighting fixtures 102. Based on the motion path, these 13 lighting fixtures 102 may be mapped to their respect spatial locations, in the order in which they are activated. For example, as the first occupant walks down the corridor 350, his motion path must trigger each of the occupancy detectors within his path sequentially. These 13 lighting fixtures 103 must therefore be aligned sequentially in the order in which they are activated. Accordingly, there may be two possible mappings of these 13 lighting fixtures 102 to the spatial locations located within the corridor 350. A correct mapping of these lighting fixtures 102 may be identified based on the floor plan 310. For example, the first of the sequence may be triggered at the spatial position "1." Alternatively, the first of the sequence may be triggered at the spatial position "13." A correct arrangement of these 13 lighting fixtures may be identified based on the floor plan 301, e.g., identifying the door as being on the North side, thus, the first occupant must enter from the North side. Therefore, the first triggered lighting fixture 102 must be mapped to the spatial position "1." As another example, time series analysis may also be performed on the occupancy data detect motion relating to specific areas within the floor plan 301, such as meeting rooms 310, 320, 330. In particular, the motion activity may be correlated to a specific time period reserved by a scheduling program for a meeting room 310, 320, 330.

A correct mapping of the lighting fixtures may be made based on the time correlated motion patterns for when a meeting room 310, 320, 330 would be in use and correlating the sequence of sequentially activated occupancy sensors with the floor plan 301 to determine which lighting fixtures 102 should be matched to spatial locations closest to the meeting rooms 310, 320, 330. Mapping of the lighting fixtures to the spatial locations within the corridor 350 may provide sufficient specificity to resolve the multiple possible mapping of lighting fixtures 102 within lighting system 100. Additionally, paths that are not taken by the occupants may also be used to identify spatial locations that do not experience any occupancy traffic with those lighting fixture 102 having occupancy sensors that do not detect any motion or occupancy information. In particular, this type of information may be useful in identifying neighboring lighting fixtures 102. The lighting system 100 may be mapping using occupancy profiles by iteratively identifying specific motion paths and mapped lighting locations having occupancy activity corresponding to the motion path to spatial locations within each motion path.

Figure 5:
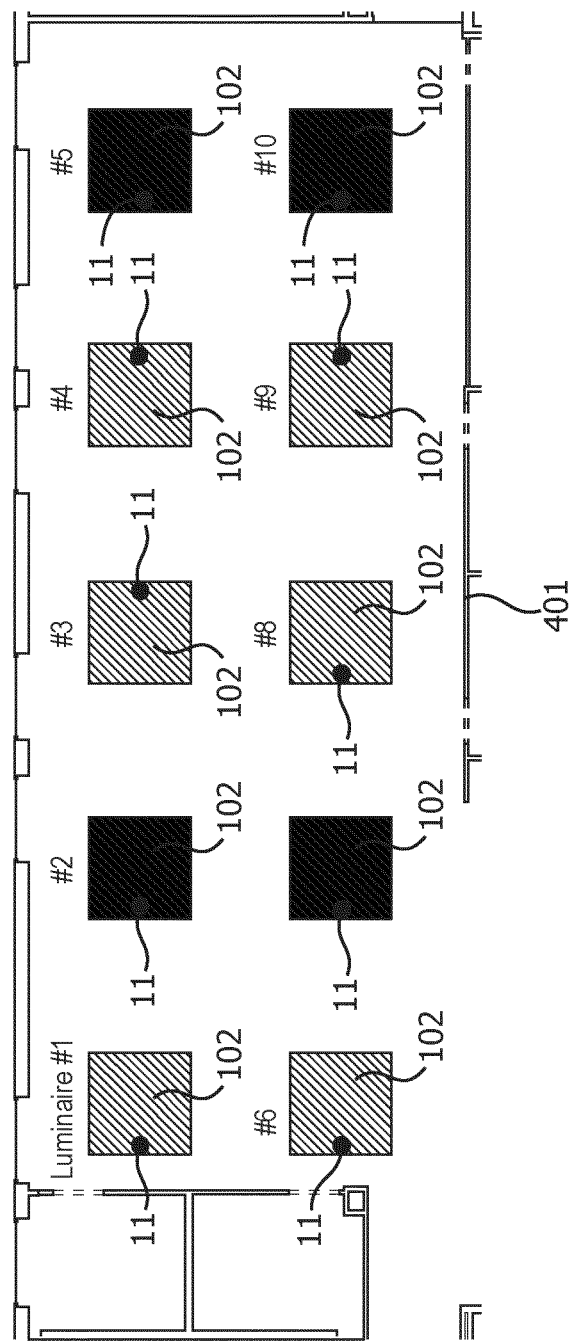
FIG. 5 shows another example of a floor plan having a plurality of light fixtures.

FIG. 5 shows another exemplary lighting system 100 having a plurality of lighting fixtures 102 installed within a floor plan 401. The lighting fixtures 102 may include a sensor of any form, including an ambient light sensor 12, an occupancy sensor 14, or any other suitable sensors that are useful for controlling the operation of the lighting fixture 102 within the lighting system 100. In certain embodiments, the sensor 10 may be included in a lighting fixture 102 in a particular orientation. Installation documentation may provide instructions to install each of the lighting fixtures 102 in a particular orientation. However, the installers may neglect such documentation and fail to orient all of the lighting fixtures 102 in the same orientation. For example, as seen in FIG. 5, the lighting fixtures 102 labeled as #3, 4 and 9 may be installed in a different orientation from the remainder of the lighting fixtures 102. The improper orientation of lighting fixtures 102 may reduce the ability for a control system to accurate control the operation of the lighting system 100. For example, improper orientation of lighting fixtures may affect the ability of the control system to provide daylight control, granular group dimming, or other functions. Therefore, it necessary to identify these variations in the installed orientation of lighting fixtures 102. In addition, an adjustment may be provided in controlling the lighting fixtures 102 to accommodate lighting fixtures 102 having altered orientations.

Figure 6:
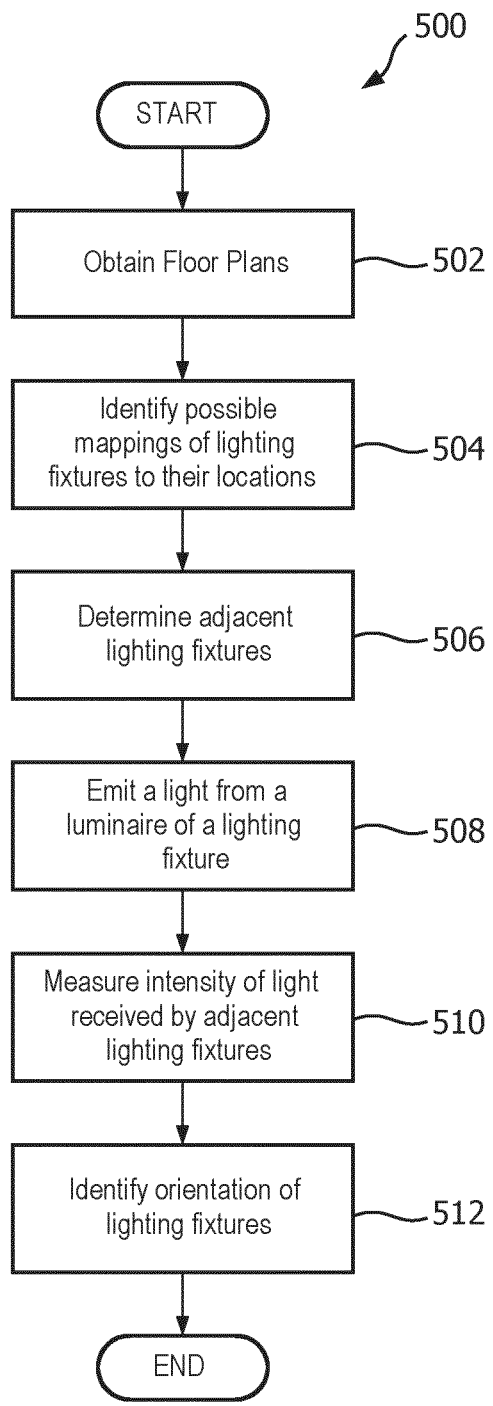
FIG. 6 shows an exemplary method for identifying orientation of a plurality of lighting fixtures according to the present invention.

FIG. 6 shows an exemplary method 500 for identifying orientation of a plurality of lighting fixtures 102 according to the present invention. The method 500 may be executed by a control system to identify the install orientation of the lighting fixtures 102. In step 502, a building floor plan 101 is received as an input in the same manner as that of step 202 described above. Next, in step 504, any suitable auto-commissioning method may be used to identify one or more possible mappings of lighting fixtures 102 to their spatial locations. The auto-commissioning method may include a heuristic analysis. In step 506, for each lighting fixture 102, determine a set of adjacent lighting fixtures based on the one or more possible mappings. The adjacent lighting fixtures may include those lighting fixtures that are immediately next to the lighting fixture 102 of interest, i.e., the lighting fixture 102 for which an orientation is to be determined. In step 508, the lighting fixture 102 of interest may be directed to emit a light from its luminaire 10. In some embodiments, the light may be emitted in accordance with a particular pattern, such as, for example, a dimming pattern, or at a predetermined intensity. In step 510, the light emitted from the lighting fixtures 102 may be received and measured by the photosensor of each of the adjacent lighting fixtures.

In step 512, the data obtained by the photosensors of the adjacent lighting fixtures may be used to determine an orientation of the lighting fixtures 102 of interest. For example, the orientation of a lighting fixture 102 may be determined based which side of the lighting fixtures 102 received a higher level of light. The side where photosensors measure a higher level of light is the orientation to which the luminaire 10 is pointed. Typically, the sensors 10 of the lighting fixtures 102 may be positions on the opposite end of the luminaire 10. In another example, the orientation of a lighting fixtures 102 may be determined based on a change in intensity of light received by the photosensor of each of the adjacent lighting fixtures in response to light emitted from the lighting fixture 102 of interest in accordance with a particular pattern, e.g., a dimming pattern. The change of light detected by the photosensors in response to the adjustments to the emitted light may also be used to approximate the spatial locations of the adjacent lighting fixtures and/or identify to the orientation of the light fixture 102 of interest.

The data obtained by method 500 may also be analyzed to resolve ambiguities in potential mappings of a plurality of lighting fixtures 102 to their spatial locations. The change of light detected by photosensors in adjacent lighting fixtures may be used to identify a mapping of the adjacent lighting fixtures to their respective spatial locations. This mapping may resolve ambiguities and identify a correct mapping for the entire lighting system 100 from more than one possible permutation identified using any suitable auto-commissioning method, particularly a heuristic method.

The invention described and claimed herein is not to be limited in scope by the specific embodiments herein disclosed since these embodiments are intended as illustrations of several aspects of this invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims. All publications cited herein are incorporated by reference in their entirety.

What is claimed is:

1. A method for mapping a plurality of lighting fixtures to a plurality of spatial locations, each lighting fixture having an occupancy sensor, the method comprising:
    generating a first dataset corresponding to a first environmental profile for the plurality of lighting fixtures based on measurements by the occupancy sensor of each of the plurality of lighting fixtures, wherein the first environmental profile includes at least one of a distribution of occupant motion over time, a flow of occupancy traffic over a period of time, or a pattern of occupancy and motion over a period of time, and a second dataset corresponding to a second environmental profile for the plurality of spatial locations based on a floor plan including the plurality of spatial locations, wherein the second environmental profile includes an estimated occupancy profile for the lighting system based on the floor plan;

identify a plurality of possible mappings of the plurality of lighting fixtures to the plurality of spatial locations; and when the plurality of possible mapping is identified, identifying a single mapping from the plurality of possible mappings based on matching the first dataset to the second dataset.

2. The method of claim 1, wherein the one or more possible mappings are identified using a heuristic method.

3. The method of claim 1, wherein the first dataset is generated by measuring motion detected by the occupancy sensor of each of the plurality of lighting fixtures, and analyzing the measurements to identifying the first environmental profile.

4. The method of claim 1, wherein the second dataset is generated based on an occupancy pattern to be detected at each of the plurality of spatial locations based on the floor plan including the plurality of spatial locations.

5. The method of claim 1, wherein each occupancy sensor is independently selected from the group consisting of a thermopile, a camera, an infrared sensor, a passive infrared (PIR) sensor, an ultrasonic sensor, and a photosynthetically active radiation (PAR) sensor.

6. A lighting system, comprising:
a plurality of lighting fixtures, each lighting fixture comprising a luminaire and an occupancy sensor; and
a control system configured to independently activate and deactivate each luminaire and to receive data corresponding to a first environmental profile for the plurality of lighting fixtures based on measurements by the occupancy sensor of each of the plurality of lighting fixtures, wherein the first environmental profile includes at least one of a distribution of occupant motion over time, a flow of occupancy traffic over a period of time, or a pattern of occupancy and motion over a period of time,
wherein the control system is further configure to generate a second dataset corresponding to a second environmental profile for the plurality of spatial locations based on a floor plan including the plurality of spatial locations, wherein the second environmental profile includes an estimated occupancy profile for the lighting system based on the floor plan, identify a plurality of possible mappings of the plurality of lighting fixtures to the plurality of spatial locations, and when the plurality of possible mapping is identified, identify a single mapping from the plurality of possible mappings based on matching the first dataset to the second dataset.

7. The lighting system of claim 6, wherein each occupancy sensor is independently selected from the group consisting of a photosensor, a thermopile and a pyranometer.

8. The lighting system of claim 6, wherein each occupancy sensor is independently selected from the group consisting of a thermopile, a camera, an infrared sensor, a passive infrared (PIR) sensor, an ultrasonic sensor, and a photosynthetically active radiation (PAR) sensor.

* * * * *